United States Patent Office 3,279,845
Patented Oct. 18, 1966

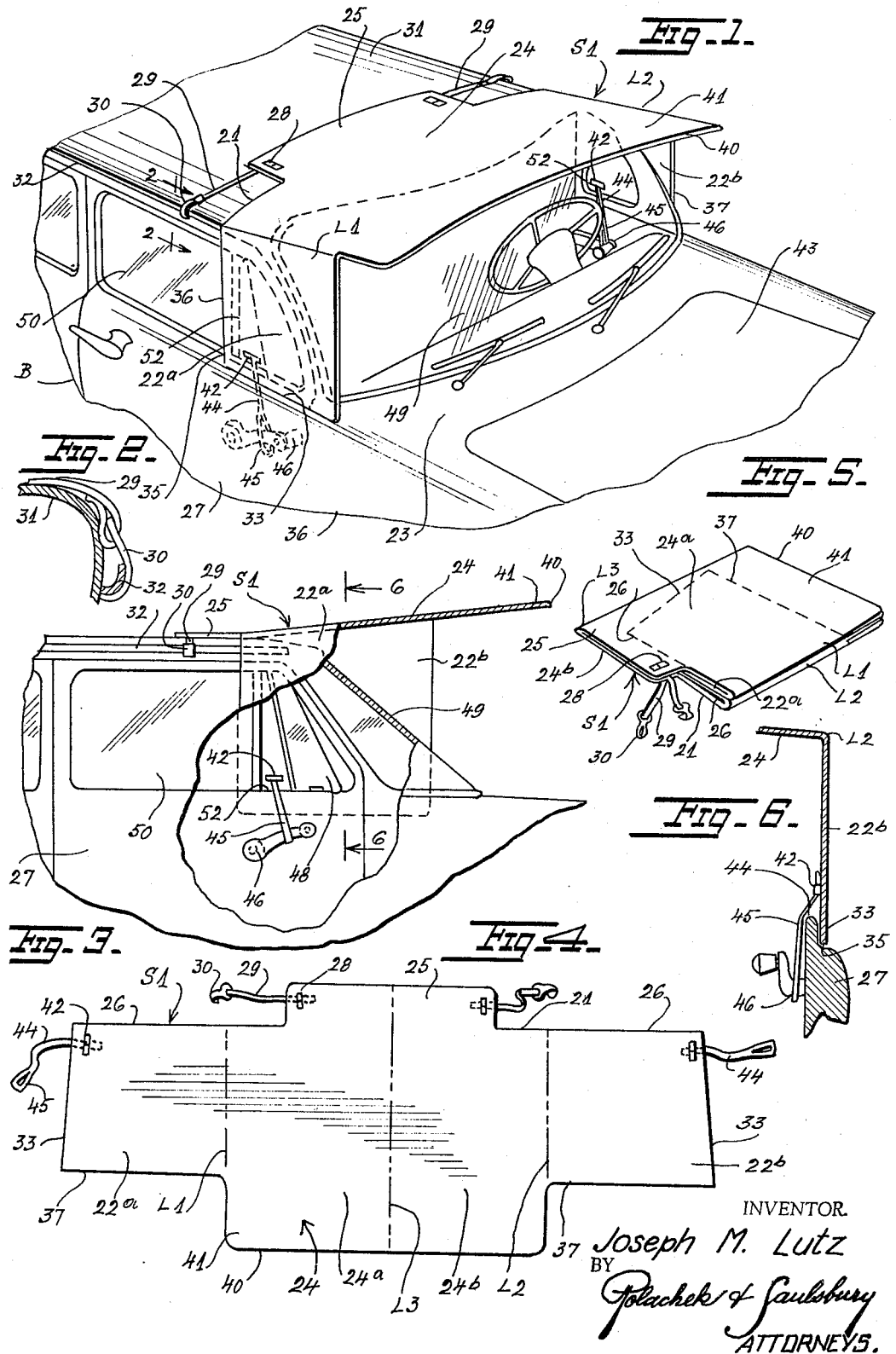

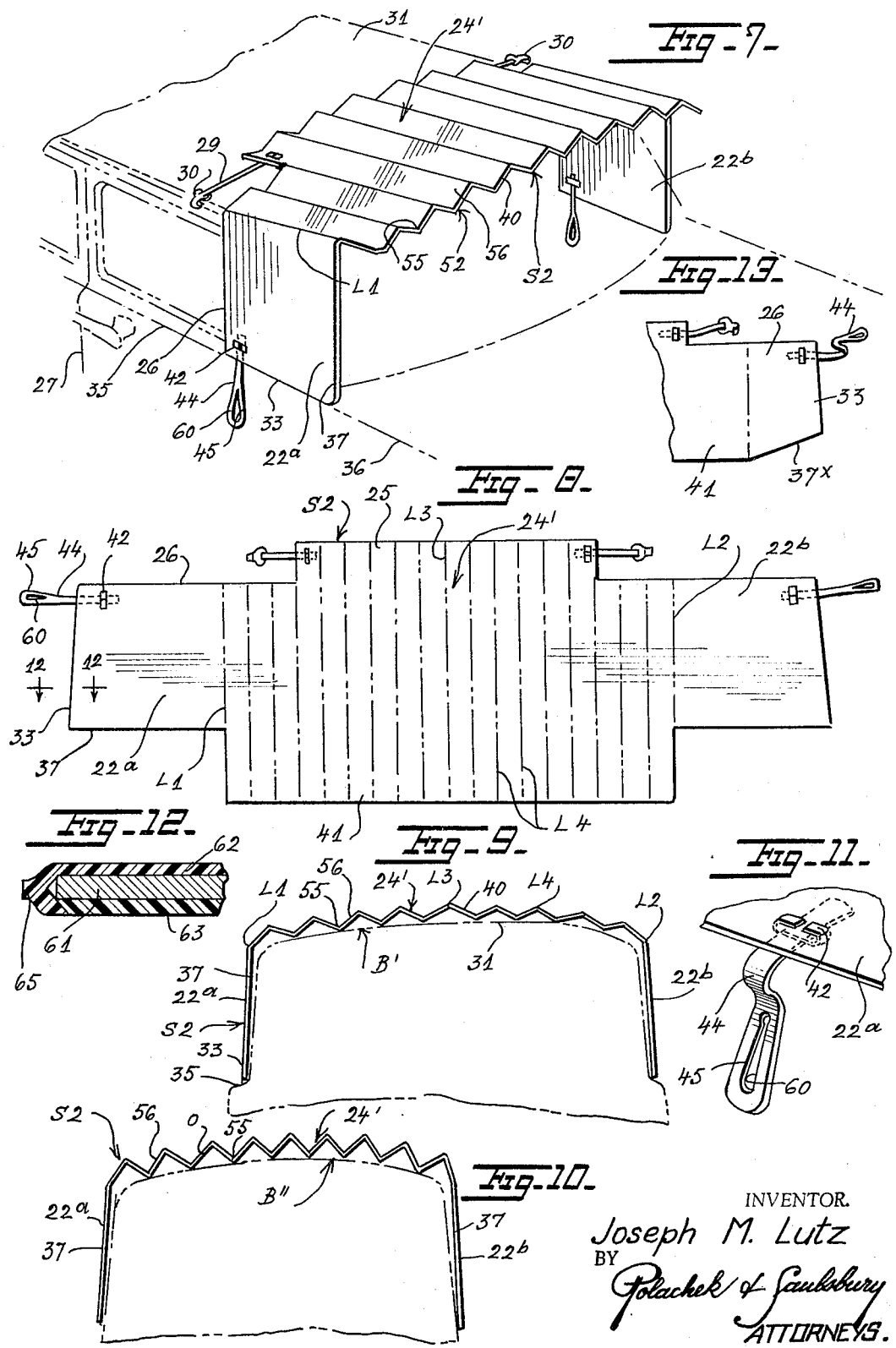

3,279,845
AUTOMOBILE RAIN GUARD FOR
DRIVE-IN THEATERS
Joseph M. Lutz, 430 E. 20th St., New York, N.Y.
Filed Jan. 19, 1965, Ser. No. 426,488
5 Claims. (Cl. 296—95)

This invention relates to detachable rainshields for automobiles, and more particularly to a rainshield adapted to be located over the windshield area of an automobile to protect the windshield from rain which may interfere with the vision of the occupants of the automobile when viewing the motion picture at a drive-in theater.

It also eliminates dangerous exhaust fumes that are created by automobiles not equipped with electric windshield wipers or automobiles that have weak or run down batteries which could not operate an electric windshield wiper for the duration of the movie.

A principal object of the invention is to provide a novel and improved rain visor for a motor vehicle, the device being simple in construction, easy to install, and highly effective in protecting the entire windshield and side wing ventilator windows from rain.

Another object of the invention is to provide an improved visor device or canopy which can be folded and stored away in a small space; which can be quickly unfolded and mounted on an automobile for temporary use; which is more effectively anchored in place than prior known rainshields; which avoids the use of suction cups in mounting; which can be quickly removed when desired; which can be inexpensively manufactured; and which can be installed and used on an automobile without danger of marring or scratching the painted surfaces of the automobile.

A further object is to provide an improved rainshield for an automobile, including a stiff central, top panel having a rearwardly extending panel section with laterally extending elastic straps having attached hooks engageable on the rain gutters of the automobile, and with side panels having further elastic straps engageable on the window adjustment crank, or door handles inside the passenger compartment.

Still another object is to provide a rainshield as described, wherein the central panel has a forward extension which slants downward toward the rear of the automobile to deflect falling rain away from the windshield to the rain gutters.

A still further object is to provide a rainshield as described, wherein the central panel has a corrugated structure with folded panel sections defining a plurality of channels for guiding falling rain rearwardly to the roof and rain gutters of the automobile.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 1 is a perspective view of a rainshield embodying the invention, shown mounted on the body of an automobile.

FIG. 2 is an enlarged fragmentary sectional view taken on line 2—2 of FIG. 1.

FIG. 3 is a side elevational view, partially in section, of the rainshield mounted on the automobile body.

FIG. 4 is a plan view of the rainshield in an extended, flattened condition.

FIG. 5 is a perspective view of the rainshield in folded condition.

FIG. 6 is a fragmentary sectional view taken on line 6—6 of FIG. 3.

FIG. 7 is a perspective view of another rainshield embodying the invention.

FIG. 8 is a plan view of the rainshield of FIG. 7, in extended, flattened condition.

FIG. 9 is a front end view of the rainshield of FIG. 7.

FIG. 10 is another front end view of the rainshield of FIG. 7.

FIG. 11 is a fragmentary perspective view of a portion of a side panel and mounting strap of the rainshield of FIG. 7.

FIG. 12 is an enlarged fragmentary sectional view taken on line 12—12 of FIG. 8.

FIG. 13 is a fragmentary top plan view of another modified form of rainshield.

Referring first to FIGS. 1–6, there is shown rainshield S1 which has a generally rectangular rigid sheet body. The body of the rainshield may be made of stiff cardboard coated on both sides with moistureproof and greaseproof plastic layers made of polyethylene, vinyl or other suitable materials having the desired properties. Alternatively the rainshield can be made of sheet plastic material such as polyester reinforced with fiberglass or any other rigid but light weight material. The body is creased or embossed during manufacture so that it can be folded on fore and aft lines L1, L2 to define two generally rectangular side panels 22a, 22b and a main central top panel 24. A further centrally located crease line L3 may be provided so that the central panel can be folded centrally to define two half panels 24a, 24b. The rainshield can thus be folded along lines L1, L2 and L3 to form three folds. The folded rainshield S1 assumes a very compact, flat form as shown in FIG. 5, so that it can be stored away in a very limited space.

This folding feature of the rainshield is very important, particularly when it is considered that hundreds of these rainshields may be required at a drive-in theater where they will be distributed to patrons as they enter the parking field. The required number of rainshields can be stacked up in a relatively small pile and can be quickly removed, set up and installed in a few seconds.

The rainshield has central rear panel section 25 extending rearwardly beyond the rear edges 26 of panels 22a, 22b. Attached by fasteners 28, near rear corners of the panel section 25 are two elastic straps 29. Hooks 30 are attached to outer ends of the straps. These hooks engage around rain gutters 32 located just above doors 27 at lateral edges of roof 31 of the automobile body B. The outer free edges 33 of the side panels 22a, 22b rest on ledges 35 of the doors 27. These ledges are continuous with ledges 36 of cowl 23 as shown in FIG. 1. Forward edges 37 of panels 22a, 22b are longer than rear edges 26 of these panels so that the central panel 24 is supported in an inclined position slanting downwardly from front edge 40 of panel section 41 to rear panel section 25. Front panel section 41 is formed as a forward extension of panel 24 extending forwardly of front edges 37 of panels 22a, 22b. The forwardly extending panel section 41 effectively covers the windshield 49 even though it may be slanted forwardly and downwardly from roof 31 to cowl 23. The panel section 41 thus serves as a visor extending over the rear portion of cowl 23 at the rear of hood 43.

The panel 41 may however have a slanting edge 37x at each end leading to the outer free edge 33 thereof instead of the straight edge 37 as shown in the modification of FIG. 13.

Near rear bottom corners of panels 22a, 22b, attached by fasteners 42 are two elastic straps 44. These straps terminate in loops 45 which can be engaged around or on crank or door handles 46 which are used to adjust the side ventilator wings 48 or side windows 50. The straps 44 extend through the openings 52 in doors 27 in which wings 48 are adjustably mounted. The straps 44 are thus located inside the passenger compartment of the automobile at both sides thereof.

The arrangement described insures a very stable mounting for the rainshield. It is also unique in that it provides freedom to leave the car by unhooking the loop 45, this frees side panel 22a, or 22b so that the desired front door can be opened without interfering or dislodging the rain guard. Vehicles with rear doors will not be effected.

The rainshield is held and stretched across the roof and down at the sides of the automobile body. Panel section 25 and rear edges 21 of the central panel 24 define a good seal against entry of rain water. Furthermore, the downwardly slanting arrangement of the central panel 24 provides a good run-off surface for falling rain water, so that it quickly and effectively drains into the rain gutters 32. Any rain water which drains to the sides of the rainshield runs off the lateral ends of panel 24 and down the smooth side panels 22a, 22b.

FIGS. 7–11 show another rainshield S2 which is similar to the rainshield S1 and corresponding parts are identically numbered. The central panel 24' is formed with a plurality of fore and aft or lengthwise crease or fold lines L4. These permit the panel 24' to be folded to define a plurality of channels or grooves 55 between narrow rectangular panel sections 56. These channels guide falling rain water directly rearwardly off the downwardly slanted corrugated central panel 24' to the rear portions of the roof 31 of the automobile. The panel sections 56 can be extended to a greater extent as shown in FIG. 9 or to a lesser extent as shown in FIG. 10 to accommodate the length of the rainshield to the width of a particular wider automobile body B' or a narrow body B". The folded panel sections stiffen the rainshield in the fore and aft direction.

FIG. 11 shows one of straps 44 engaged on the underside or rear inner side of panel 22a and held by a staple 42. The long eye 60 in loop 45 permits the loop to be engaged on window adjustment crank handles of different sizes.

FIG. 12 shows clearly the laminated structure of the sheet material used for the rainshield. Cardboard layer 61 is coated on both sides with plastic layers 62, 63. If desired the plastic layers can be fused together to form a hermetic edge seal 65 which extends all around the periphery of the rainshield.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A rainshield for use upon an automobile body having a roof, rain gutters and lateral edges of the roof, a front windshield extending downwardly from the roof, a cowl at the bottom end of the windshield, and side doors hinged to the body, said side doors having windows mounted in openings in the doors and adjustable by turnable crank handles; comprising, a generally rectangular sheet of relatively stiff material having two fore and aft crease lines defining two generally rectangular side panels and a central panel, and a third crease line dividing the central panel into two sections so that the sheet is foldable compactly into a generally rectangular form with four overlaying panel sections, said central panel having a rear section extending rearwardly of rear edges of the side panels, elastic straps secured at one end thereof to corners of said rear section, hooks on other ends of the straps for engaging on the rain gutters respectively, said central panel having a front section extending forwardly of front edges of the side panels for extending over said windshield and central portion of said cowl, said side panels having straight lateral edges for resting on horizontal ledges formed in said doors and cowl, and two other elastic straps secured to bottom rear corners of the side panels respectively, said other straps having loops at free ends thereof for engaging on said crank handles when the other straps are inserted through the window openings in the doors of the automobile, whereby the central panel and side panels are held tensioned over the roof and along the sides of the automobile body shielding the windshield from falling rain.

2. A rainshield for use upon an automobile body having a roof, rain gutters at lateral edges of the roof, a front windshield extending downwardly from the roof, a cowl at the bottom end of the windshield, and side doors hinged to the body, said side doors having windows mounted in openings in the doors and adjustable by turnable crank handles; comprising, a generally rectangular sheet of relatively stiff material having two fore and aft crease lines defining two generally rectangular side panels and a central panel, and a third crease line dividing the central panel into two sections so that the sheet is foldable compactly into a generally rectangular form with four overlaying panel sections, said central panel having a rear section extending rearwardly of rear edges of the side panels, elastic straps secured at one end thereof to corners of said rear section, hooks on other ends of the straps for engaging on the rain gutters respectively, said central panel having a front section extending forwardly of front edges of the side panels for extending over said windshield and central portion of said cowl, said side panels having straight lateral edges for resting on horizontal ledges formed in said doors and cowl, and two other elastic straps secured to bottom rear corners of the side panels respectively, said other straps having loops at free ends thereof for engaging on said crank handles when the other straps are inserted through the window openings in the doors of the automobile, whereby the central panel and side panels are held tensioned over the roof and along the sides of the automobile body shielding the windshield from falling rain, the front edges of the side panels being longer than the rear edges of the side panels so that part of the central panel forwardly of the rear section thereof inclines downwardly and rearwardly from the front edge of the front panel section to define a slanted run-off surface for rainwater falling on the central panel.

3. A rainshield for use upon an automobile body having a roof, rain gutters at lateral edges of the roof, a front windshield extending downwardly from the roof, a cowl at the bottom end of the windshield, and side doors hinged to the body, said side doors having windows mounted in openings in the doors and adjustable by turnable crank handles; comprising, a generally rectangular sheet of relatively stiff material having two fore and aft crease lines defining two generally rectangular side panels and a central panel, and a third crease line dividing the central panel into two sections so that the sheet is foldable compactly into a generally rectangular form with four overlaying panel sections, said central panel having a rear section extending rearwardly of rear edges of the side panels, elastic straps secured at one end thereof to corners of said rear section, hooks on other ends of the straps for engaging on the rain gutters respectively, said central panel having a front section extending forwardly of front edges of the side panels for extending over said windshield and central portion of said cowl, said side panels having straight lateral edges for resting on horizontal ledges formed in said doors and cowl, and two other elastic straps secured to bottom rear corners of the side panels respectively, said other straps having loops at free ends thereof for engaging on said crank handles when the other straps are inserted through the window openings in the doors of the automobile, whereby the central panel and side panels are held tensioned over the roof and along the sides of the automobile body shielding the windshield from falling rain, said central panel having a further plurality of fore and aft extending crease lines defining a plurality of narrow panel sections for stiffening the central panel in the fore and aft direction, said narrow panel sections being angularly disposed to each other defining fore and aft extending channels for guiding rearwardly on to the roof rain water falling on the central panel.

4. A rainshield for use upon an automobile body having a roof, rain gutters at lateral edges of the roof, a front windshield extending downwardly from the roof, a cowl at the bottom end of the windshield, and side doors hinged to the body, said side doors having windows mounted in openings in the doors and adjustable by turnable crank handles; comprising, a generally rectangular sheet of relatively stiff material having two fore and aft crease lines defining two generally rectangular side panels and a central panel, and a third crease line dividing the central panel into two sections so that the sheet is foldable compactly into a generally rectangular form with four overlaying panel sections, said central panel having a rear section extending rearwardly of rear edges of the side panels, elastic straps secured at one end thereof to corners of said rear section, hooks on other ends of the straps for engaging on the rain gutters respectively, said central panel having a front section extending forwardly of front edges of the side panels for extending over said windshield and central portion of said cowl, said side panels having straight lateral edges for resting on horizontal ledges formed in said doors and cowl, and two other elastic straps secured to bottom rear corners of the side panels respectively, said other straps having loops at free ends thereof for engaging on said crank handles when the other straps are inserted through the window openings in the doors of the automobile, whereby the central panel and side panels are held tensioned over the roof and along the sides of the automobile body shielding the windshield from falling rain, said central panel having a further plurality of fore and aft extending crease lines defining a plurality of narrow panel sections for stiffening the central panel in the fore and aft direction, said narrow panel sections being angularly disposed to each other defining fore and aft extending channels for guiding rearwardly on to the roof rain water falling on the central panel, the front edges of the side panels being longer than the rear edges of the side panels so that part of the central panel forwardly of the rear section thereof inclines downwardly and rearwardly from the front edge of the front panel section to define a slanted run-off surface for rain water falling on the central panel.

5. A rainshield for use upon an automobile body having a roof, rain gutters at lateral edges of the roof, a front windshield extending downwardly from the roof, a cowl at the bottom end of the windshield, and side doors hinged to the body, said side doors having windows mounted in openings in the doors and adjustable by turnable crank handles; comprising, a generally rectangular sheet of relatively stiff material having two fore and aft crease lines defining two generally rectangular side panels and a central panel, and a third crease line dividing the central panel into two sections so that the sheet is foldable compactly into a generally rectangular form with four overlaying panel sections, said central panel having a rear section extending rearwardly of rear edges of the side panels, elastic straps secured at one end thereof to corners of said rear section, hooks on other ends of the straps for engaging on the rain gutters respectively, said central panel having a front section extending forwardly of front edges of the side panels for extending over said windshield and central portion of said cowl, said side panels having straight lateral edges for resting on horizontal ledges formed in said doors and cowl, and two other elastic straps secured to bottom rear corners of the side panels respectively, said other straps having loops at free ends thereof for engaging on said crank handles when the other straps are inserted through the window openings in the doors of the automobile, whereby the central panel and side panels are held tensioned over the roof and along the sides of the automobile body shielding the windshield from falling rain, the front edges of the side panels being longer than the rear edges of the side panels so that part of the central panel forwardly of the rear section thereof inclines downwardly and rearwardly from the front edge of the front panel section to define a slanted run-off surface for rain water falling on the central panel, said sheet material being formed of stiff cardboard coated on opposite sides with moistureproof, greaseproof plastic.

References Cited by the Examiner
UNITED STATES PATENTS

| | | | |
|---|---|---|---|
| 2,797,961 | 7/1962 | McKay | 296—95 |
| 3,123,394 | 3/1964 | Corsetti | 296—95 |
| 3,214,216 | 10/1965 | Brown | 296—95 |

BENJAMIN HERSH, *Primary Examiner.*

J. A. PEKAR, *Assistant Examiner.*